United States Patent
Baughman et al.

(10) Patent No.: US 11,335,131 B2
(45) Date of Patent: May 17, 2022

(54) UNMANNED AERIAL VEHICLE MAINTENANCE AND UTILITY PLAN

(71) Applicant: INTERNATIONAL BUSINESS MACHINES CORPORATION, Armonk, NY (US)

(72) Inventors: Aaron K. Baughman, Cary, NC (US); Shikhar Kwatra, Durham, NC (US); Gray Cannon, Miami, FL (US); Gary William Reiss, Buford, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 16/688,025

(22) Filed: Nov. 19, 2019

(65) Prior Publication Data

US 2021/0150826 A1    May 20, 2021

(51) Int. Cl.
*B64C 39/02*    (2006.01)
*G05D 1/00*    (2006.01)
(Continued)

(52) U.S. Cl.
CPC ............ *G07C 5/006* (2013.01); *B64C 39/024* (2013.01); *G06N 3/0454* (2013.01); *G06Q 10/20* (2013.01);
(Continued)

(58) Field of Classification Search
CPC ...... G07C 5/006; G07C 5/0808; G07C 5/008; G07C 5/00; B64C 39/024;
(Continued)

(56) References Cited

U.S. PATENT DOCUMENTS

| 8,478,479 B2 | 7/2013 | Ghelam |
| 9,651,945 B1 | 5/2017 | Erickson et al. |

(Continued)

FOREIGN PATENT DOCUMENTS

| CN | 105539869 | 5/2016 |
| CN | 107991952 | 5/2018 |

(Continued)

OTHER PUBLICATIONS

Kovalenko et al. "Application of Queuing Systems with Ultimate Reliability to Optimize the Operation of Drones ", MATEC Web of Conferences 99, 02005, 2017, 3 pages.

(Continued)

*Primary Examiner* — Yonel Beaulieu
(74) *Attorney, Agent, or Firm* — Brian Restauro; Andrew D. Wright; Roberts Calderon Safran & Cole, P.C.

(57) ABSTRACT

A computer-implemented method includes: receiving, by a computer device, sensor data for a plurality of UAVs in a fleet of UAVs; applying, by the computer device, logistic regression to the sensor data; predicting, by the computer device, a probability of malfunction of each UAV in the fleet of UAVs based on the applying; combining, by the computer device, the probability of malfunction of each UAV with a pre-existing malfunction data set to produce an intermediate malfunction data set; generating, by the computer device, additional cases of predicted UAV malfunctions with a GAN, the GAN using the intermediate malfunction data set as initial training data for the GAN; combining, by the computer device, the additional cases with the intermediate malfunction data set to produce a combined malfunction data set; and comparing, by the computer device, the sensor data for a first UAV of the UAVs to the combined malfunction data set.

20 Claims, 6 Drawing Sheets

(51) Int. Cl.
    *G07C 5/00*     (2006.01)
    *G06Q 10/00*     (2012.01)
    *G06N 3/00*     (2006.01)
    *G07C 5/08*     (2006.01)
    *G06N 3/04*     (2006.01)

(52) U.S. Cl.
    CPC ...... *G07C 5/0808* (2013.01); *B64C 2201/042* (2013.01)

(58) Field of Classification Search
    CPC .............. B64C 2201/042; B64C 39/02; G06N 3/0454; G06N 3/00; G06Q 10/20; B64F 5/40; B64F 5/00
    See application file for complete search history.

(56) References Cited

U.S. PATENT DOCUMENTS

| | | | |
|---|---|---|---|
| 10,336,202 | B2 | 7/2019 | Panopoulos et al. |
| 11,153,109 | B2* | 10/2021 | Kwatra ................. G10L 15/183 |
| 2018/0096541 | A1 | 4/2018 | O'Brien et al. |
| 2019/0129405 | A1 | 5/2019 | Cella et al. |
| 2020/0226430 | A1* | 7/2020 | Ahuja ................... G06K 9/6257 |
| 2020/0301015 | A1* | 9/2020 | Siddiqui ............... G01S 17/006 |
| 2020/0304290 | A1* | 9/2020 | Coulmeau ............... H04L 9/008 |

FOREIGN PATENT DOCUMENTS

| | | |
|---|---|---|
| CN | 108345946 | 7/2018 |
| KR | 101867553 | 6/2018 |

OTHER PUBLICATIONS

Petritoli et al. "Reliability and Maintenance Analysis of Unmanned Aerial Vehicles", Sensors, Sep. 19, 2018, 16 pages vol. 18,93171.
Segal et al. "Maintenance of a Drone Fleet", Annual Reliability and Maintainability Symposium (RAMS), 2018, 3 pages.
Anonymous, "System for UAV Fleet Predictive Maintenance" IP.com, Oct. 22, 2018, 3 pages.
Zheng et al. "Generative Adversarial Networks for Failure Prediction", Industrial AI Lab, Hitachi America Ltd, Sep. 2019, 17 pages.
Lee et al. "Application of Deep Neural Network and Generative Adversarial Network to Industrial Maintenance: A Case Study of Induction Motor Fault Detection", IEEE International Conference on Big Data, 2017, pp. 3248-3253, 6 pages.
Mao et al. "Resource Management with Deep Reinforcement Learning", 2016 ACM. ISBN 978-1-4503-4661-0/16/11, Nov. 9-10, 2016, 7 pages.
Adesgautam, "https://github.com/adesgautam/AirML", downloaded Nov. 13, 2019, 4 pages.
Mell et al., "The NIST Definition of Cloud Computing", NIST, Special Publication 800-145, Sep. 2011, 7 pages.

* cited by examiner

UNMANNED AERIAL VEHICLE MAINTENANCE AND UTILITY PLAN

BACKGROUND

Aspects of the present invention relate generally to fleet maintenance and, more particularly, to optimizing the utility of a fleet of unmanned aerial vehicles taking into account updating and other maintenance.

Many entities including, for example, delivery companies maintain large fleets of delivery vehicles such as, for example, unmanned aerial vehicles (UAVs). The delivery vehicles can require maintenance including part replacement and software, and other, updates to keep the delivery vehicles in optimal condition for performing their delivery functions.

SUMMARY

In a first aspect of the invention, there is a computer-implemented method including: receiving, by a computer device, sensor data for a plurality of unmanned aerial vehicles (UAVs) in a fleet of UAVs; applying, by the computer device, logistic regression to the sensor data; predicting, by the computer device, a probability of malfunction of each UAV in the fleet of UAVs based on the applying; combining, by the computer device, the probability of malfunction of each UAV with a pre-existing malfunction data set to produce an intermediate malfunction data set; generating, by the computer device, additional cases of predicted UAV malfunctions with a generative adversarial network (GAN), the GAN using the intermediate malfunction data set as initial training data for a discriminator network of the GAN; combining, by the computer device, the additional cases with the intermediate malfunction data set to produce a combined malfunction data set; and comparing, by the computer device, the sensor data for a first UAV of the UAVs to the combined malfunction data set.

In another aspect of the invention, there is a computer program product including a computer readable storage medium having program instructions embodied therewith. The program instructions are executable by a computing device to cause the computing device to: receive sensor data for a plurality of unmanned aerial vehicles (UAVs) in a fleet of UAVs; apply logistic regression to the sensor data; predict a probability of malfunction of each UAV in the fleet of UAVs based on the applying; combine the probability of malfunction of each UAV with a pre-existing malfunction data set to produce an intermediate malfunction data set; generate additional cases of predicted UAV malfunctions with a generative adversarial network (GAN), the GAN using the intermediate malfunction data set as initial training data for a discriminator network of the GAN; combine the additional cases with the intermediate malfunction data set to produce a combined malfunction data set; and compare the sensor data for a first UAV of the UAVs to the combined malfunction data set.

In another aspect of the invention, there is system including a processor, a computer readable memory, and a computer readable storage medium. The system includes: program instructions to receive sensor data for a plurality of unmanned aerial vehicles (UAVs) in a fleet of UAVs; program instructions to apply logistic regression to the sensor data; program instructions to predict a probability of malfunction of each UAV in the fleet of UAVs based on the applying; program instructions to combine the probability of malfunction of each UAV with a pre-existing malfunction data set to produce an intermediate malfunction data set; program instructions to generate additional cases of predicted UAV malfunctions with a generative adversarial network (GAN), the GAN using the intermediate malfunction data set as initial training data for a discriminator network of the GAN; program instructions to combine the additional cases with the intermediate malfunction data set to produce a combined malfunction data set; and program instructions to compare the sensor data for a first UAV of the UAVs to the combined malfunction data set. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to fleet maintenance and, more particularly, to optimizing the utility of a fleet of unmanned aerial vehicles taking into account updating and other maintenance. While "unmanned aerial vehicle", "UAV", and "drone" are used in this disclosure to describe embodiments of the invention, it is noted that embodiments apply to unmanned vehicles such as, for example, unmanned water vehicles and unmanned land vehicles. According to aspects of the invention, a preventative maintenance system improves or optimizes the efficiency of a fleet of UAVs or other vehicles by predicting an optimal time for maintenance. In embodiments, a computer-implemented method includes: receiving sensor data for a plurality of unmanned aerial vehicles (UAVs) in a fleet of UAVs; applying logistic regression to the sensor data; predicting, by the computer device, a probability of malfunction of each UAV in the fleet of UAVs based on the applying; combining the probability of malfunction of each UAV with a pre-existing malfunction data set to produce an intermediate malfunction data set; generating additional cases of predicted UAV malfunctions with a generative adversarial network (GAN), the GAN using the intermediate malfunction data set as initial training data for a discriminator network of the GAN; combining the additional cases with the intermediate malfunction data set to produce a combined malfunction data set; and comparing the sensor data for a first UAV of the UAVs to the combined malfunction data set. In this manner, implementations of the invention improve the production of a fleet of UAVs or other vehicles.

Embodiments of the invention address how to ensure an optimal preventative maintenance schema for UAVs (or other vehicles) where companies or other entities are operating them in swarms for package delivery or carrying/executing certain computationally intensive operations. Embodiments solve this problem of iteratively monitoring a plethora of sensors associated with UAVs/swarms of UAVs based on multiple attributes in order to derive an optimized maintenance and utility plan.

In embodiments, a computer-implemented method includes predicting an optimal time for a UAV upgrade (or maintenance) based on aberrations that occur on a threshold amount of UAVs in a fleet of UAVs (using sensor data from each UAV of the fleet of UAVs) using Node-RED to generate data used in the prediction and then having a generative adversarial network (GAN) with reinforcement learning (RL) framework generate the predicted optimal time. In embodiments, the aberrations that occur are calculated from data sets that are generated/simulated from a Node-RED environment and ingested into a GAN with RL framework. Embodiments further include optimizing a service impact of a UAV flagged for upgrade based on a consideration of workload for the UAV, an amount of time estimated for the UAV to be repaired, time of year, forecasted weather, monetary constraints, and prior performance of the UAV. Embodiments further include predicting UAV health based on a consideration of environment exposure factors and/or wear rate.

Embodiments further include using artificial intelligence (AI) models to optimize UAV dispatch and routing which sends lower risk UAVs to users/tasks having a greater priority. In embodiments, a computer device uses AI to learn from previous assignments of UAVs having particular sensor data and the results of those assignments. The computer device predicts a likelihood of a successful assignment based on a comparison of the sensor data of a subsequent UAV to the sensor data of UAVs having previously completed similar assignments, and assigns UAVs having a lower risk of failure to high value assignments.

Embodiments include the prediction and provision of the optimal time for a UAV upgrade based on aberrations occurring on the set of UAVs (including sensor values) while operating in a given environment, wherein the dataset/corner cases are generated/simulated from a Node-RED environment and ingested into a GAN with RL framework. Embodiments include optimizing service impact relative to forecast demand for UAV deliveries vs. time to repair and/or replace a UAV. Embodiments include modifying a UAV depending on the time of year, forecasted weather, affordance of job, life expectancy, and/or prior performance. Embodiments include measuring UAV component environment exposure factors, performance, wear rate and duty cycle to make predictions of success/failure and overall UAV health. Embodiments include using AI models to optimize UAV dispatch and routing, including suggesting lower risk UAVs for more valuable/critical cargo or VIP customers, and accurately amortize service life to the maximum possible.

Embodiments include ablation task acceptance to isolate degrading parts that are detected by isolated functional use. In embodiments, a computer device receives sensor data that the computer device processes through logistic regression to determine a probability of a malfunction of a UAV or other vehicle. In embodiments, the computer device predicts when a malfunction is likely to occur.

Implementations of the invention are improvements to the functioning of a computer. For example, generating additional cases of predicted UAV malfunctions with a generative adversarial network (GAN), where the GAN uses an intermediate malfunction data set as initial training data for a discriminator network of the GAN, improves the accuracy of a computer when predicting when a UAV should be removed from service. In addition, implementations of the invention include features that are not well understood, routine, or conventional activity in the relevant art. For example, generating additional cases of predicted UAV malfunctions with a generative adversarial network (GAN), where the GAN uses an intermediate malfunction data set as initial training data for a discriminator network of the GAN, to predicting when a UAV should be removed from service is not well-understood, routine, or conventional.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
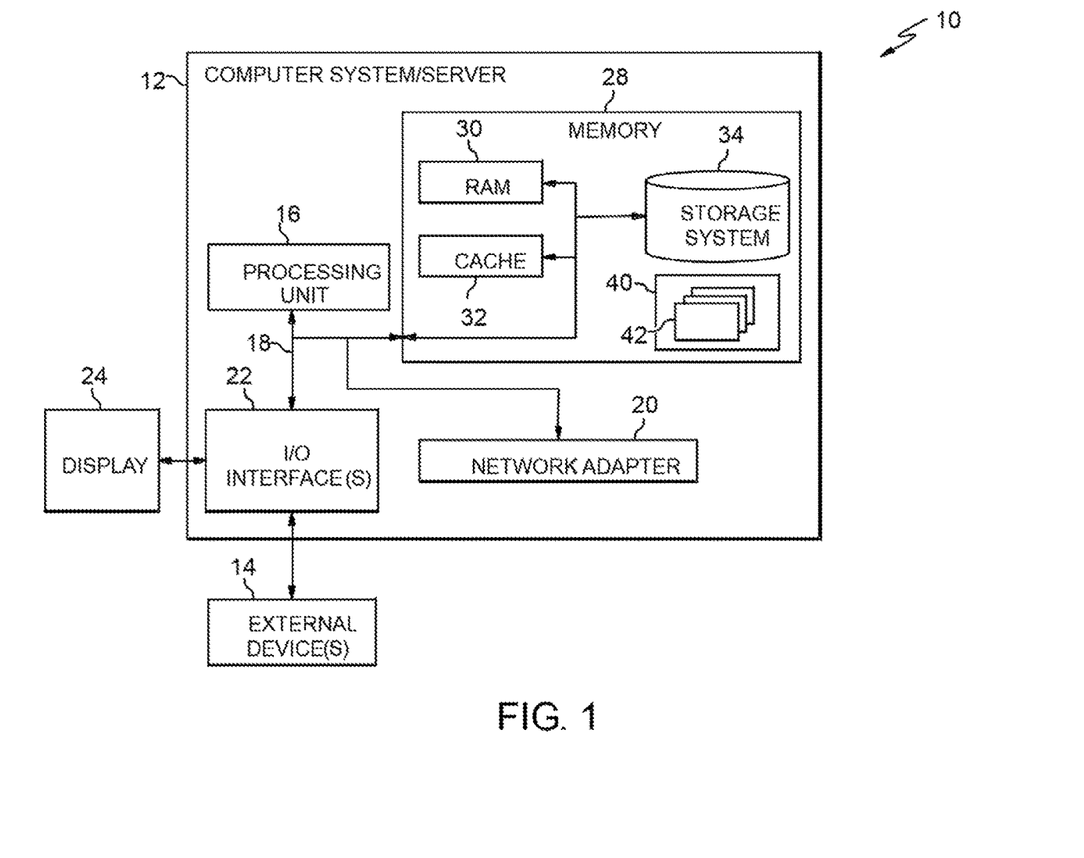
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
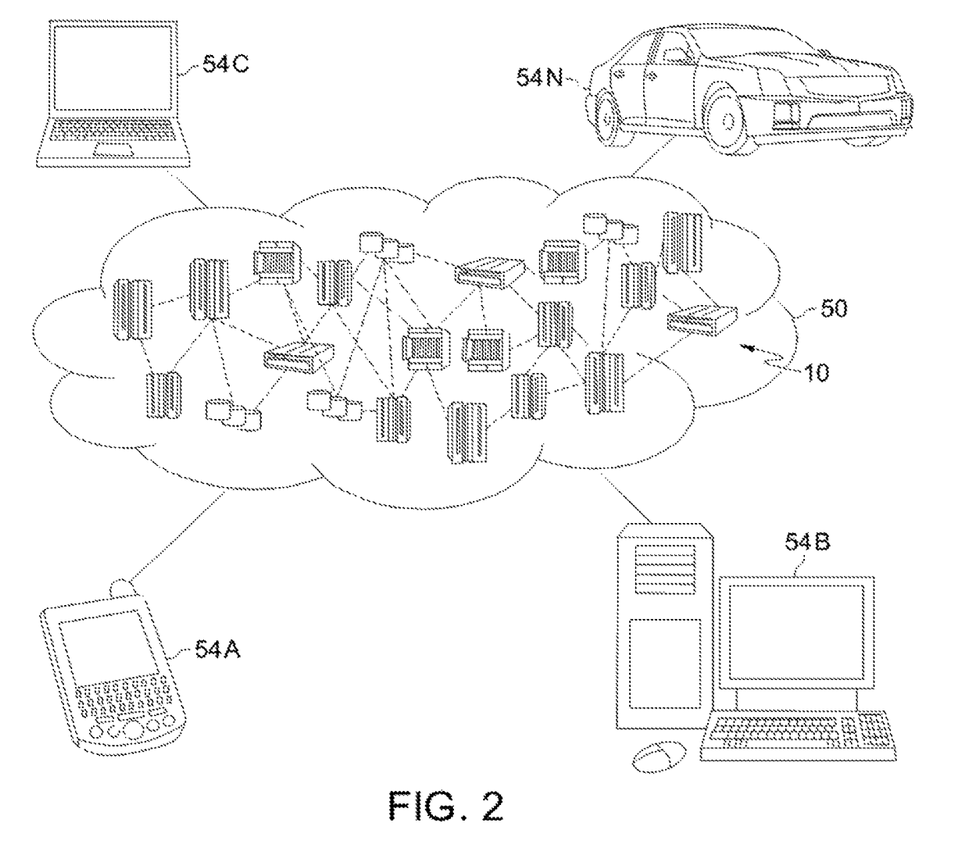
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
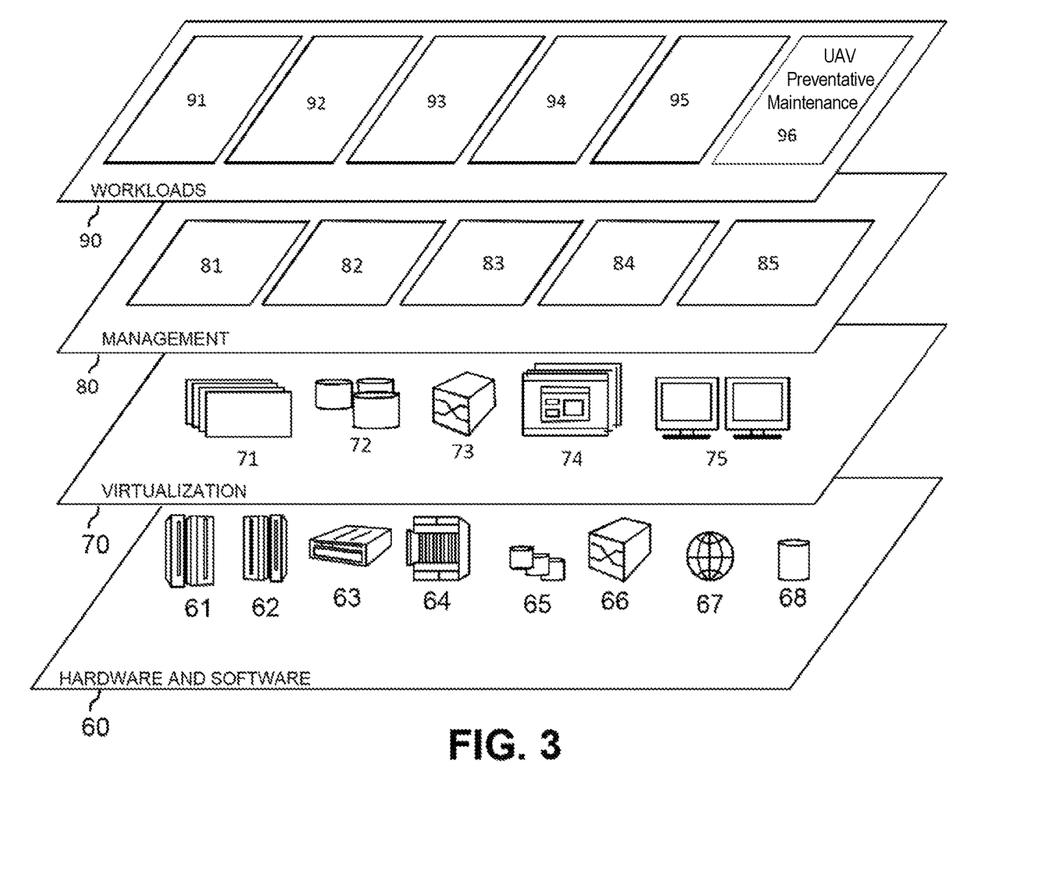
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and UAV preventative maintenance 96.

Implementations of the invention may include a computer system/server 12 of FIG. 1 in which one or more of the program modules 42 are configured to perform (or cause the computer system/server 12 to perform) one of more functions of the UAV preventative maintenance 96 of FIG. 3. For example, the one or more of the program modules 42 may be configured to: receive sensor data for a plurality of unmanned aerial vehicles (UAVs) in a fleet of UAVs; apply logistic regression to the sensor data; predict a probability of malfunction of each UAV in the fleet of UAVs based on the applying; combine the probability of malfunction of each UAV with a pre-existing malfunction data set to produce an intermediate malfunction data set; generate additional cases of predicted UAV malfunctions with a generative adversarial network (GAN), the GAN using the intermediate malfunction data set as initial training data for a discriminator network of the GAN; combine the additional cases with the intermediate malfunction data set to produce a combined malfunction data set; and compare the sensor data for a first UAV of the UAVs to the combined malfunction data set.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
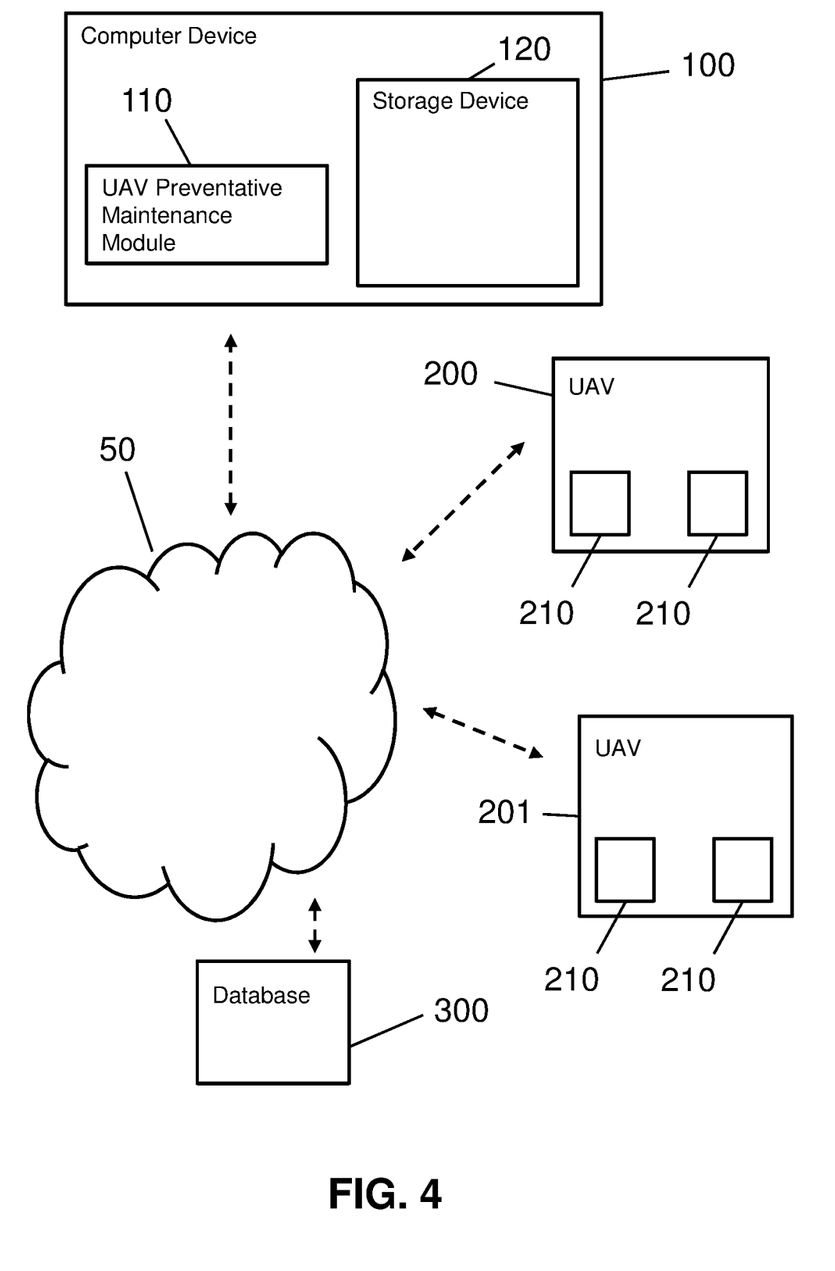
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks such as, for example cloud computing environment 50. In this example, computer device 100 includes a UAV preventative maintenance module 110, for example, one or more of program modules 42 in FIG. 1, and a storage device 120 such as, for example, storage system 34 in FIG. 1.

FIG. 4 shows two UAVs 200, 201 (other examples interact with fewer or more than two UAVs 200, 201) that each have a plurality of sensor 210. Each sensor 210 monitors and/or polls a parameter of the UAV or a parameter that effects the UAV. Examples of sensors 210 include sensors that monitor or poll altitude, air temperature, air humidity, motor speed, motor load, motor current draw, battery condition, battery projected life, sounds generated by the UAV, sounds in the environment of the UAV, and any other parameter that potentially effects the performance of the UAV. FIG. 4 shows a database 300 such as, for example, external device 14 in FIG. 1, that stores, for example, data related to orders, the forecasting of orders, replacement part inventory, software or other update inventory, and replacement UAV inventory, and/or other maintenance, replacement, operations data. In embodiments, UAV preventative maintenance module 110 performs methods described below.

Figure 5:
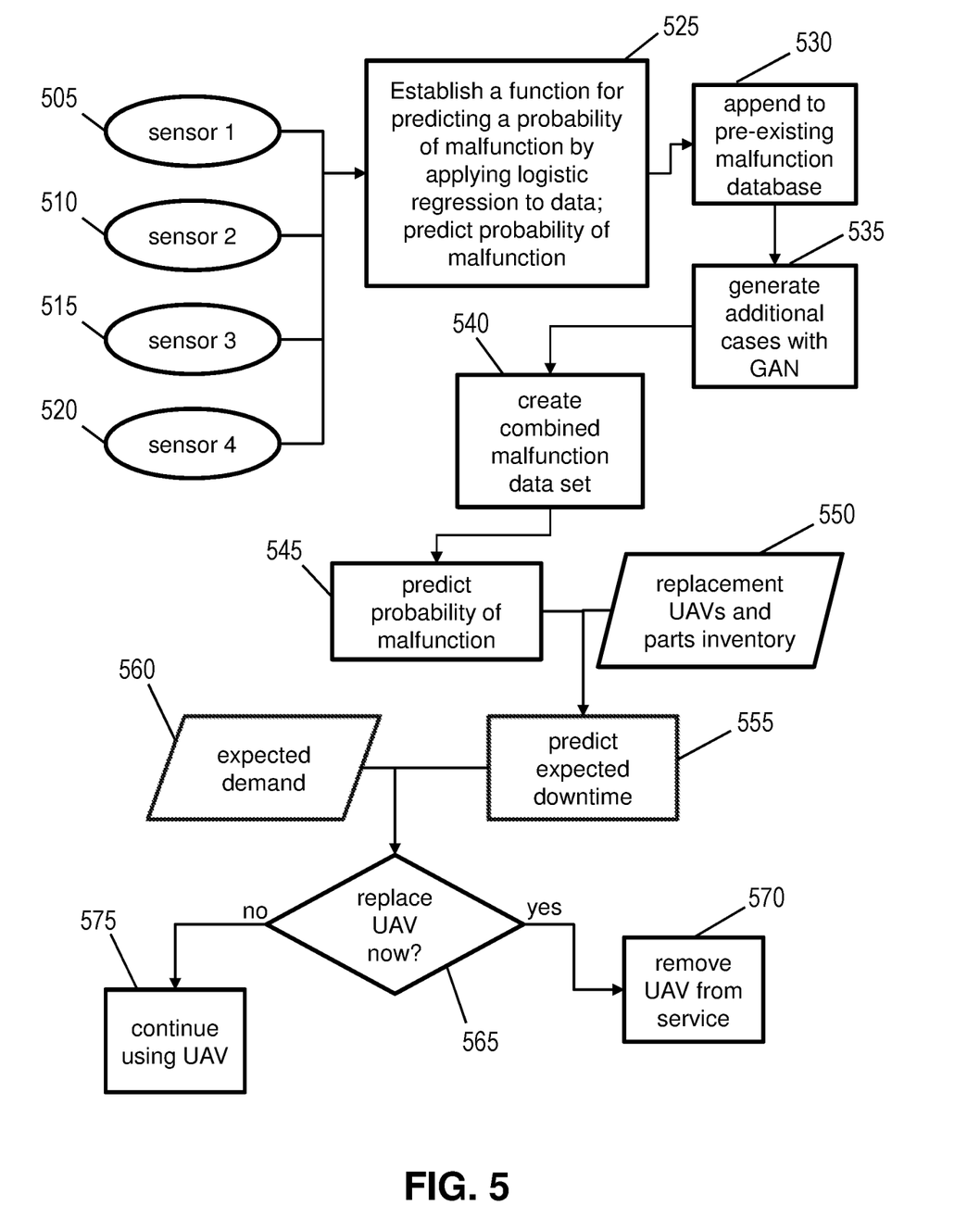
FIG. 5 shows a flowchart of an exemplary method in accordance with aspects of the invention.

FIG. 5 shows a block diagram of an exemplary method in accordance with aspects of the invention. Steps of the method may be carried out in the environment of FIG. 4 and are described with reference to elements depicted in FIG. 4.

In embodiments, a plurality of sensors 505, 510, 515, 520 collect data regarding various parameters related to UAV performance and/or condition. In embodiments, and as described with respect to elements depicted in FIG. 4, sensors 210 of FIG. 4 include sensors 505, 510, 515, 520. For example, one or more of sensors 505, 510, 515, 520 collect data from monitoring or polling altitude, air temperature, air humidity, motor speed, motor load, motor current draw, battery condition, battery projected life, sounds generated by the UAV, sounds in the environment of the UAV, and any other parameter that potentially effects the performance of the UAV.

At step 525, the system establishes a function for predicting a probability of malfunction by applying logistic regression to the data collected from sensors 505, 510, 515, 520. The system then predicts a probability of malfunction for each of a plurality of UAVs based on the function using the data for that particular UAV. The probabilities of malfunction for each UAV (based on the particular set of sensor data for that UAV) become cases to be combined in step 530 with pre-existing cases. The logistic regression is based on the data received from sensors 505, 510, 515, 520 for each of the UAVs. In embodiments, and as described with respect to elements depicted in FIG. 4, UAV preventative maintenance module 110 performs logistic regression on the data from sensors 210 for each of UAVs 200, 201 to establish a function for the probability of malfunction. UAV preventive maintenance module 110 then uses the function to predict the probability of malfunction of a particular UAV. The logistic regression results in a prediction as to the probability of malfunction of the UAV based on that UAV's data. In embodiments, UAV preventative maintenance module 110 uses the data from some or all of sensors 210 and/or other data to perform the logistic regression. In embodiments, UAV preventative maintenance module 110 applies selective classification algorithms to the training data, including, but not limited to, XGBoost or logistic regression algorithms. In embodiments, UAV preventative maintenance module 110 uses Node-Red, or some other browser-based flow editor, as an environment for applying logistic regression to the data collected from the sensors. Step 525 is repeated for some or all of the UAVs in the fleet of UAVs.

At step 530, the system appends the probability of malfunction for each of the UAVs to one or more pre-existing malfunction databases. In embodiments, and as described with respect to elements depicted in FIG. 4, UAV preventative maintenance module 110 appends the probability of malfunction predicted at step 525 for each of the UAVs to database 300 to create an intermediate malfunction data set. The intermediate malfunction data set includes historical malfunction data (probability of malfunction with certain sensor data) as well as the currently predicted probabilities of malfunction (from step 525) and serves as the basis for generating additional cases of predicted malfunctions in step 535.

At step 535, the system generates additional cases of predicted UAV malfunctions using a GAN with the intermediate malfunction data set serving as the initial training data for a discriminator network of the GAN. In embodiments, and as described with respect to elements depicted in FIG. 4, UAV preventative maintenance module 110 generates additional cases of probability of UAV malfunctions using a GAN. These additional cases are in addition to the cases of probability of malfunction predicted at step 525. UAV preventative maintenance module 110 then adds the additional cases to the intermediate malfunction data set to create a combined malfunction data set.

At step 545, the system predicts a probability of malfunction for a particular UAV of the UAVs based on comparing the sensor data for a particular UAV to the combined malfunction data set. In embodiments, and as described with respect to elements depicted in FIG. 4, UAV preventative maintenance module 110 then predicts a probability of malfunction UAV 200 based on comparing the sensor data from sensors 210 with the combined malfunction data set.

At step 555, the system predicts an expected downtime of the particular UAV by considering the probability of malfunction from step 545 and a replacement UAV and part inventory 550. In embodiments, and as described with respect to elements depicted in FIG. 4, UAV preventative maintenance module 110 predicts an expected downtime of UAV 200 by considering the probability of malfunction from step 545 and a replacement UAV and part inventory 550. For example, in embodiments, the predicted downtime is larger if a part that is predicted to fail is not currently available in a parts inventory. As another example, in embodiments, the predicted downtime is smaller (or zero) if a replacement UAV is immediately available. In this manner, the predicting may be based on availability of other UAVs in the fleet of UAVs.

At step 565, the system determines if the particular UAV should be replaced immediately considering the predicted downtime from step 555 and an expected demand for the particular UAV 560. In embodiments, and as described with respect to elements depicted in FIG. 4, UAV preventative maintenance module 110 determines if UAV 200 should be replaced immediately considering the predicted downtime from step 555 and an expected demand for UAV 200. In embodiments, the expected demand for UAV 200 is the expected demand for UAVs having the same or sufficiently similar characteristics and/or abilities as UAV 200.

In embodiments, UAV preventative maintenance module 110 uses a version of the knapsack algorithm to determine if the particular UAV should be replaced at a particular time. An example of an application of the 0-1 knapsack algorithm in accordance with embodiments of the invention follows, where A=a UAV, and B=a fleet of UAVs.

In a first step of the 0-1 knapsack algorithm, UAV preventative maintenance module 110 calculates B's maximum strength capacity (W in knapsack).

a. Find the maximum positional strength $$P_{max} = \max(S_{t1te} \ldots S_{t1rb})$$

b. Sum A's auction values with a risk tolerance parameter.

$$A_{pmax}(\overline{Pl}, \alpha) = \alpha * \sum_{ui=0}^{N} auctionVal(Pl_i); Pl_i \in P_{max}; \alpha \geq 1$$

c. Set the maximum weight capacity for the knapsack algorithm.

$$W_{ks} = A_{pmax}(\overline{Pl}, \alpha)$$

In a second step of the 0-1 knapsack algorithm, UAV preventative maintenance module 110 assigns each of the other UAVs in the fleet with a value or auction value ($v_i$ in knapsack).

$$\forall_i v_{ti} = \text{auction}_i$$

In a third step of the 0-1 knapsack algorithm, UAV preventative maintenance module 110 assigns each of the UAVs in the fleet with a cost associated with downtime ($w_i$ in knapsack). The cost is related to the importance of the position for A and the contribution of A's projected utility and overall B in addition to A's positional rank. In this example, the range of $w_i$ is from 0 to 4.

$$\forall_i \; wt_i = \frac{l_{tli}}{\max(I_{tposition})} + \frac{Pl_{iprojected}}{\sum_{k=0}^{N} Pl_{kprojected}} + \frac{Pl_{iprojected}}{\sum_{j=0}^{position} Pl_{jprojected}} + Pl_{normrank}$$

In a fourth step of the 0-1 knapsack algorithm, UAV preventative maintenance module 110 runs the 0-1 knapsack algorithm to get proposed A's for a trade from the fleet.

$$\text{maximize} \sum_{i=1}^{n} v_{ti} x_{ti}$$

With constraints:

$$\sum_{i=1}^{n} w_{ti} x_{ti} \leq W_{ks}; \; x_i \in \{0, 1\}$$

In a fifth step of the 0-1 knapsack algorithm, UAV preventative maintenance module 110 retrieves A that belong to the maximized and $2^{nd}$ maximized set from the 0-1 knapsack algorithm.

$$\overline{T_{p1}}; \overline{T_{p2}}$$

In a sixth step of the 0-1 knapsack algorithm, UAV preventative maintenance module 110 runs the 0-1 knapsack algorithm again.

In a seventh step of the 0-1 knapsack algorithm, UAV preventative maintenance module 110, from the current A's swarms, encodes 0-1 knapsack similar to the second and third steps. UAV preventative maintenance module 110 keeps the same maximum weight capacity as in sub-step c of the first step.

$$w_{cti}; v_{cti}; W_{ks}$$

In an eighth step of the 0-1 knapsack algorithm, UAV preventative maintenance module 110 runs the 0-1 knapsack algorithm for the current UAV.

In a ninth step of the 0-1 knapsack algorithm, UAV preventative maintenance module 110 retrieves the UAVs that belong to the maximized and $2^{nd}$ maximized set from the 0-1 knapsack algorithm.

$$\overline{T_{cp1}}; \overline{T_{cp2}}$$

$$\{\overline{T_{cp1}}; \overline{T_{p1}}\}; \{\overline{T_{cp2}}; \overline{T_{p2}}\}$$

In a tenth step of the 0-1 knapsack algorithm, UAV preventative maintenance module 110 pairs the tradable UAVs together.

In an eleventh step of the 0-1 knapsack algorithm, UAV preventative maintenance module 110 determines the likelihood the trade will be accepted by both swarms of UAVs.

$$\tau_1 = P(\{\overline{T_{cp1}}, \overline{T_{p1}}\}); \tau_2 = P(\{\overline{T_{cp2}}, \overline{T_{p2}}\})$$

In a twelfth step of the 0-1 knapsack algorithm, UAV preventative maintenance module 110 displays the trade packages on a user interface $$\{\overline{T_{cp1}}; \overline{T_{p1}}, \tau_1\}; \{\overline{T_{cp2}}; \overline{T_{p2}}, \tau_2\}$$

If, at step 565 of FIG. 5, the system determines that the particular UAV should be replaced immediately, then the particular UAV is removed from service at step 570. In embodiments, and as described with respect to elements depicted in FIG. 4, if, at step 565, UAV preventative maintenance module 110 determines that UAV 200 should be replaced immediately, then UAV preventative maintenance module 110 marks UAV 200 for removal from service and UAV 200 is removed from service at step 570.

If, at step 565, the system determines that the particular UAV should not be replaced immediately, then the particular UAV continues being used at step 575. In embodiments, and as described with respect to elements depicted in FIG. 4, if, at step 565, UAV preventative maintenance module 110 determines that UAV 200 should not be replaced immediately, then UAV preventative maintenance module 110 does not mark UAV 200 for removal from service and UAV 200 remains in the UAV fleet as operational and available at step 575.

Figure 6:
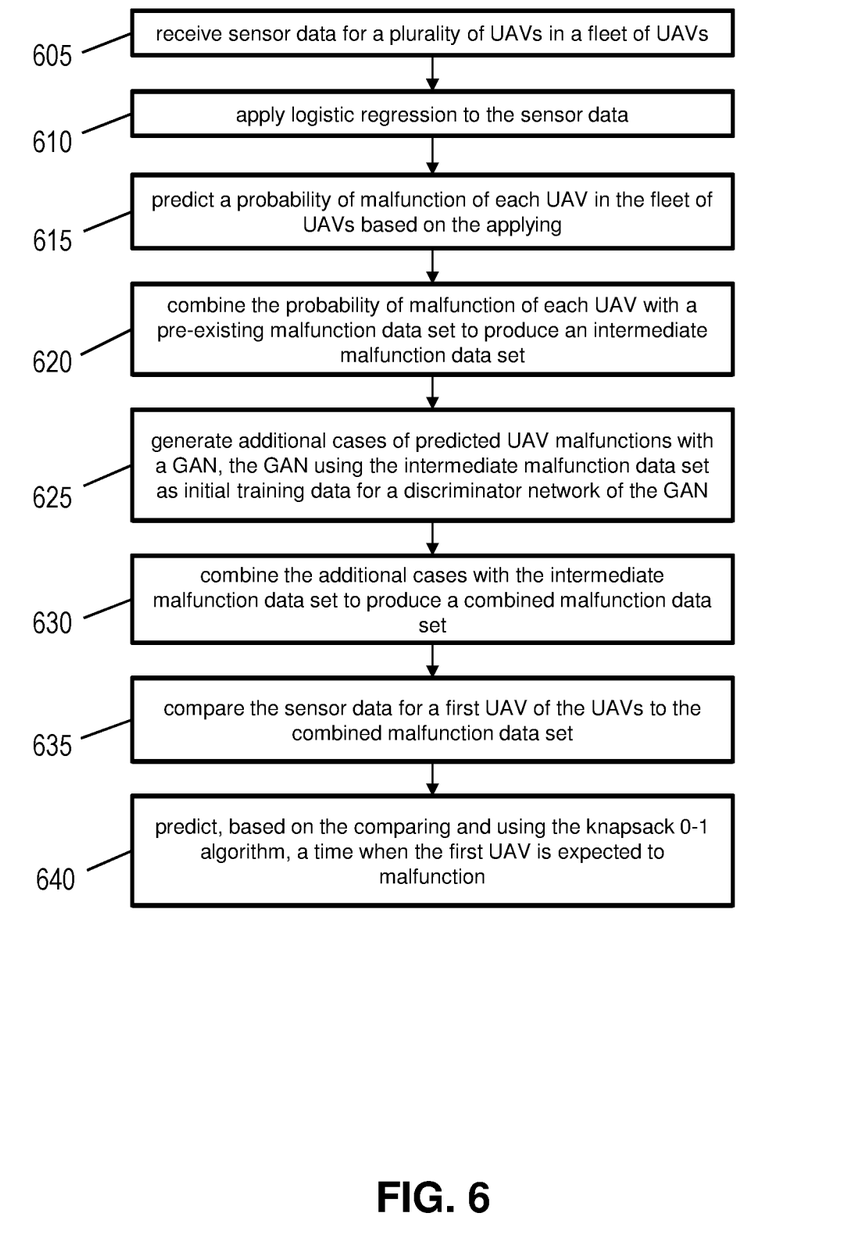
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system receives sensor data for a plurality of UAVs in a fleet of UAVs. In embodiments, and as described with respect to FIG. 4, UAV preventative maintenance module 110 receives sensor data from sensors 210 for a plurality of UAVs 200.

At step 610, the system applies logistic regression to the sensor data. In embodiments, and as described with respect to FIG. 4, UAV preventative maintenance module 110 applies logistic regression to the sensor data received from sensors 210 for a plurality of UAVs 200, 201 in step 605.

At step 615, the system predicts a probability of malfunction of each UAV in the fleet of UAVs based on the applying in step 610. In embodiments, and as described with respect to FIG. 4, UAV preventative maintenance module 110 predicts a probability of malfunction of each UAV 200, 201 in the fleet of UAVs based on the application of the logistic regression to the sensor data in step 610.

At step 620, the system combines the probability of malfunction of each UAV with a pre-existing malfunction data set to produce an intermediate malfunction data set. In embodiments, and as described with respect to FIG. 4, UAV preventative maintenance module 110 combines the probability of malfunction of each UAV 200, 201 from step 610 with a pre-existing malfunction data set to produce an intermediate malfunction data set.

At step 625, the system generates additional cases of predicted UAV malfunctions with a GAN, the GAN using the intermediate malfunction data set as initial training data for a discriminator network of the GAN. In embodiments, and as described with respect to FIG. 4, UAV preventative maintenance module 110 generates additional cases of predicted UAV malfunctions with a GAN, the GAN using the intermediate malfunction data set produced in step 620 as initial training data for a discriminator network of the GAN.

At step 630, the system combines the additional cases with the intermediate malfunction data set to produce a combined malfunction data set. In embodiments, and as described with respect to FIG. 4, UAV preventative maintenance module 110 combines the additional cases from step 625 with the intermediate malfunction data set from step 620 to produce a combined malfunction data set.

At step 635, the system compares the sensor data for a first UAV of the UAVs to the combined malfunction data set. In embodiments, and as described with respect to FIG. 4, UAV preventative maintenance module 110 compares the sensor data from sensors 210 for a first UAV 200 of the UAVs to the combined malfunction data set.

At step 640, the system predicts, based on the comparing and using the knapsack 0-1 algorithm, a time when the first UAV is expected to malfunction. In embodiments, and as described with respect to FIG. 4, UAV preventative maintenance module 110 predicts, based on the comparing of step 635 and using the knapsack 0-1 algorithm, a time when first UAV 200 is expected to malfunction.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computer device, sensor data for a plurality of unmanned aerial vehicles (UAVs) in a fleet of UAVs;
    applying, by the computer device, logistic regression to the sensor data;
    predicting, by the computer device, a probability of malfunction of each UAV in the fleet of UAVs based on the applying;
    combining, by the computer device, the probability of malfunction of each UAV with a pre-existing malfunction data set to produce an intermediate malfunction data set;
    generating, by the computer device, additional cases of predicted UAV malfunctions with a generative adversarial network (GAN), the GAN using the intermediate malfunction data set as initial training data for a discriminator network of the GAN;
    combining, by the computer device, the additional cases with the intermediate malfunction data set to produce a combined malfunction data set; and
    comparing, by the computer device, the sensor data for a first UAV of the UAVs to the combined malfunction data set to predict the probability of malfunction for the first UAV.

2. The computer-implemented method of claim 1, further comprising predicting, by the computer device, an optimal time to perform a service on the first UAV based on the comparing.

3. The computer-implemented method of claim 2, wherein the predicting an optimal time is further based on an availability of materials required for the service.

4. The computer-implemented method of claim 3, wherein the materials comprise a software upgrade.

5. The computer-implemented method of claim 2, wherein the predicting an optimal time is further based on an expected down-time of the first UAV required to perform the service.

6. The computer-implemented method of claim 2, wherein the predicting an optimal time is further based on an expected demand for the first UAV.

7. The computer-implemented method of claim 2, wherein the predicting an optimal time is further based on an availability of other UAVs in the fleet of UAVs.

8. The computer-implemented method of claim 2, wherein the predicting an optimal time comprises applying the 0-1 knapsack algorithm, $$\text{maximize} \sum_{i=1}^{n} v_{ti} x_{ti}$$

With constraints:

$$\sum_{i=1}^{n} w_{ti} x_{ti} \le W_{ks}; x_i \in \{0, 1\}$$

where $W_{ks}$=the maximum allowable cost associated with downtime of the fleet of UAVs, $v_i$=a utility of each UAV in the fleet of UAVs, and $w_i$=a cost associated with downtime of each UAV in the fleet of UAVs.

9. The computer-implemented method of claim 8, wherein the utility is a payload capacity of each of the UAVs of the fleet of UAVs.

10. The computer-implemented method of claim 1, wherein the predicting a probability of malfunction comprises generating the probability of malfunction using Node-RED.

11. The computer-implemented method of claim 1, wherein the sensor data comprises remaining battery power, projected battery life, and current battery drain.

12. The computer-implemented method of claim 1, wherein the sensor data is received from sensors on the UAVs.

13. The computer-implemented method of claim 1, wherein the computer device includes software provided as a service in a cloud computing environment.

14. A computer program product, the computer program product comprising one or more computer readable storage media having program instructions embodied therewith, the program instructions executable by a computing device to cause the computing device to:
receive sensor data for a plurality of unmanned aerial vehicles (UAVs) in a fleet of UAVs;
apply logistic regression to the sensor data;
predict a probability of malfunction of each UAV in the fleet of UAVs based on the applying;
combine the probability of malfunction of each UAV with a pre-existing malfunction data set to produce an intermediate malfunction data set;
generate additional cases of predicted UAV malfunctions with a generative adversarial network (GAN), the GAN using the intermediate malfunction data set as initial training data for a discriminator network of the GAN;
combine the additional cases with the intermediate malfunction data set to produce a combined malfunction data set; and
compare the sensor data for a first UAV of the UAVs to the combined malfunction data set to predict the probability of malfunction for the first UAV.

15. The computer program product of claim 14, wherein the program instructions further cause the computing device to predict, based on the comparing, a time when the first UAV is expected to malfunction.

16. The computer program product of claim 14, wherein the sensor data comprises altitude, humidity, and air temperature.

17. A system comprising:
a processor, a computer readable memory, and one or more computer readable storage media;
program instructions to receive sensor data for a plurality of unmanned aerial vehicles (UAVs) in a fleet of UAVs;
program instructions to apply logistic regression to the sensor data;
program instructions to predict a probability of malfunction of each UAV in the fleet of UAVs based on the applying;
program instructions to combine the probability of malfunction of each UAV with a pre-existing malfunction data set to produce an intermediate malfunction data set;
program instructions to generate additional cases of predicted UAV malfunctions with a generative adversarial network (GAN), the GAN using the intermediate malfunction data set as initial training data for a discriminator network of the GAN;
program instructions to combine the additional cases with the intermediate malfunction data set to produce a combined malfunction data set; and
program instructions to compare the sensor data for a first UAV of the UAVs to the combined malfunction data set,
wherein the program instructions are stored on the one or more computer readable storage media for execution by the processor via the computer readable memory.

18. The system of claim 17, further comprising program instructions to predict an optimal time to remove the first UAV from service based on the comparing.

19. The system of claim 18, wherein the predicting an optimal time comprises applying the 0-1 knapsack algorithm, $$\text{maximize} \sum_{i=1}^{n} v_{ti} x_{ti}$$

With constraints:

$$\sum_{i=1}^{n} w_{ti} x_{ti} \leq W_{ks}; x_i \in \{0, 1\}$$

where $W_{ks}$=the maximum allowable cost associated with downtime of the fleet of UAVs, $v_i$=a utility of each UAV in the fleet of UAVs, and $w_i$=a cost associated with downtime of each UAV in the fleet of UAVs.

20. The system of claim 19, wherein the predicting an optimal time is further based on an availability of other UAVs in the fleet of UAVs.

* * * * *